(12) United States Patent
Nakauchi

(10) Patent No.: US 8,345,263 B2
(45) Date of Patent: Jan. 1, 2013

(54) MEASUREMENT METHOD AND MEASUREMENT APPARATUS THAT MEASURE A SURFACE FIGURE OF AN ASPHERIC SURFACE BASED ON AN INTERFERENCE PATTERN

(75) Inventor: Akihiro Nakauchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/633,107

(22) Filed: Dec. 8, 2009

(65) Prior Publication Data

US 2010/0149547 A1    Jun. 17, 2010

(30) Foreign Application Priority Data

Dec. 17, 2008 (JP) ................................. 2008-321476
Dec. 17, 2008 (JP) ................................. 2008-321477

(51) Int. Cl.
*G01B 11/02* (2006.01)

(52) U.S. Cl. ...................................... 356/513; 356/515

(58) Field of Classification Search .................. 356/513, 356/515, 489, 495; 382/141
See application file for complete search history.

(56) References Cited

U.S. PATENT DOCUMENTS

| | | | | |
|---|---|---|---|---|
| 5,416,586 | A * | 5/1995 | Tronolone et al. | 356/513 |
| 5,940,181 | A * | 8/1999 | Tsubono et al. | 356/508 |
| 6,456,382 | B2 * | 9/2002 | Ichihara et al. | 356/513 |
| 6,781,700 | B2 | 8/2004 | Kuchel | |
| 7,212,291 | B2 * | 5/2007 | De Lega et | 356/512 |
| 7,342,667 | B1 * | 3/2008 | Freimann et al. | 356/515 |
| 2003/0048457 | A1 * | 3/2003 | Evans et al. | 356/513 |
| 2005/0083537 | A1 * | 4/2005 | Kuchel | 356/513 |
| 2005/0157311 | A1 * | 7/2005 | Kuchel | 356/513 |
| 2007/0177156 | A1 * | 8/2007 | Mansfield | 356/512 |
| 2007/0201035 | A1 | 8/2007 | Dresel | |
| 2010/0177322 | A1 | 7/2010 | Nakauchi | |

FOREIGN PATENT DOCUMENTS

| | | |
|---|---|---|
| JP | 4-048201 A | 2/1992 |
| JP | 2000-097663 A | 4/2000 |

* cited by examiner

*Primary Examiner* — Tarifur Chowdhury
*Assistant Examiner* — Michael P Lapage
(74) *Attorney, Agent, or Firm* — Canon USA, Inc., IP Division

(57) ABSTRACT

The present invention provides a measurement apparatus that illuminates a surface to be tested having an aspheric surface using light beams that form spherical waves to measure a figure of the surface to be tested, including a detection unit configured to detect interference patterns between light beams from the surface to be tested and light beams from a reference surface, and a controller configured to control processing for obtaining a figure of the surface to be tested based on the interference patterns detected by the detection unit.

8 Claims, 10 Drawing Sheets

F I G. 3
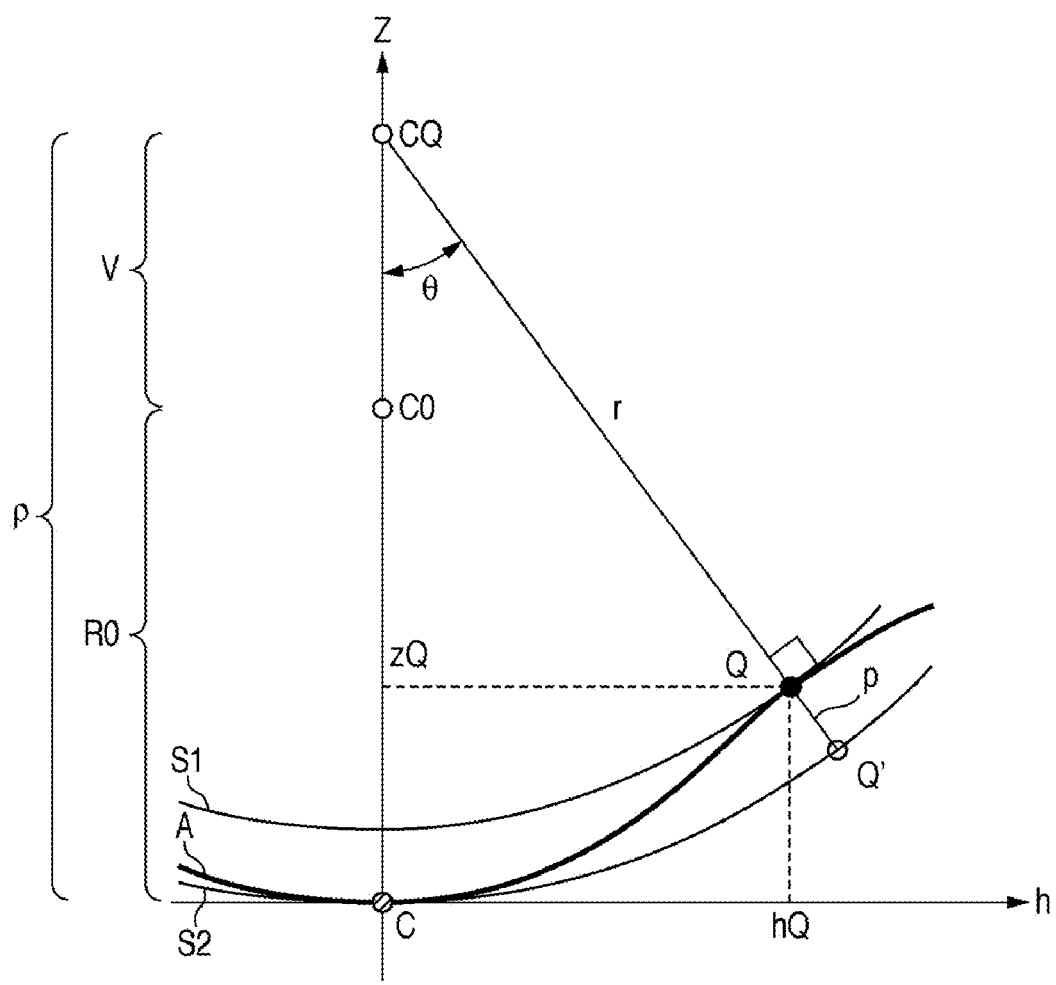

MEASUREMENT METHOD AND MEASUREMENT APPARATUS THAT MEASURE A SURFACE FIGURE OF AN ASPHERIC SURFACE BASED ON AN INTERFERENCE PATTERN

BACKGROUND OF THE INVENTION

1. Field of the Invention

The present invention relates to measurement methods and measurement apparatuses.

2. Description of the Related Art

Innovations in optical systems are brought about by introducing new optical elements or degrees of freedom. For example, improving (enhancing) optical performance by introducing aspheric surfaces is one item that has long been pursued. In recent years, along with advancements in processing technologies and measurement technologies, aspheric surfaces have started to be introduced into exposure apparatuses for semiconductor device manufacturing, which demands the greatest precision. Broadly divided there have been three effects of introducing aspheric surfaces into exposure apparatuses.

A first effect is a reduction in the number of optical elements. In recent years there has been increasing use of short wavelengths in an exposure light and it has been necessary to use high cost glass materials such as quartz and fluorite in optical systems for exposure apparatuses. Accordingly, the reduction in the number of optical elements due to the introduction of aspheric surfaces has advantages in aspects relating to the manufacturing and cost of optical elements.

A second effect is the miniaturization (increasing compactness) of optical systems. Miniaturization of optical systems has become possible by introducing aspheric surfaces, and therefore the influence with respect to aspects relating to the manufacturing and cost of optical systems has been to an extent that cannot be ignored.

A third effect is increasingly high performance of optical systems. A role fulfilled by aspheric surfaces is extremely important in achieving higher optical performance that is increasingly being called for in terms of higher numerical apertures (NA) and lower aberration.

On the other hand, for exposure apparatuses to support rapidly promoting miniaturization of semiconductor devices, consideration is being given to using extreme ultra violet (EUV) rays having a wavelength of approximately 10 nm to 15 nm as an exposure light. Since no glass material (transmissive material) exists through which light transmits in the wavelength range of EUV rays, the optical system must be configured using only mirrors (reflective members) without using lens. However, reflective materials are also limited for the wavelength range of EUV rays and the reflectivity per single mirror is approximately 70%. Accordingly, since an optical system that satisfies desired optical performance must be configured using as few mirrors as possible, high precision processing and measuring of optical elements (mirrors) having a predetermined aspheric surface figure have become essential technologies. Furthermore, a large aperture optical element (for example, a concave mirror or the like having an effective diameter of 560 mm) is necessary to preserve a highly precise resolution while maintaining an appropriate exposure range using a small number of mirrors.

Thus, a technique for measuring a surface figure of an optical element using an interferometer is proposed in the specification of U.S. Pat. No. 6,781,700. In the specification of U.S. Pat. No. 6,781,700, a surface to be tested having a rotationally symmetric figure is illuminated using light beams that form spherical waves, and this surface to be tested is scanned while being driven in an optical axis direction, thereby obtaining an aspheric surface figure from a drive amount v of the surface to be tested and an optical path length difference p between a position at which the interference patterns become null in a zonal manner and a paraxial center position. Furthermore, based on the drive amount v, a position on the surface to be tested (a position from the aspheric surface axis) h is obtained by solving expression 1 below. Here, null refers to a state in which a density of interference patterns is low.

$$vm(h) = z(h) - R0 + h/z'(h) \quad \text{(Expression 1)}$$

However, z(h) is a design formula that expresses an aspheric surface figure, z'(h) is a value obtained by differentiating z(h) with respect to h, R0 is a paraxial curvature radius, and vm is a measured value of v.

Furthermore, technologies that give attention to measuring abscissas, which are positional information of the surface to be tested, are proposed in Japanese Patent Laid-Open No. 4-48201, Japanese Patent Laid-Open No. 2000-97663, and the specification of U.S. patent application publication No. 2007/0201035. In Japanese Patent Laid-Open No. 4-48201, Japanese Patent Laid-Open No. 2000-97663, and the specification of U.S. patent application publication No. 2007/0201035, a relationship between a surface to be tested and an image sensor of an interferometer is obtained based on a difference between a measured result of a state in which the surface to be tested and the reference surface are aligned (alignment state) and a measured result of a state shifted from the alignment state (nonalignment state).

However, with these conventional technologies, there is a limit to the measurement precision for aspheric surfaces (particularly large aperture aspheric surfaces), and highly precise measurements and processing cannot be achieved for aspheric surfaces having an aspheric surface amount above a predetermined value. As is well known, measurement and processing are inseparable, and it is impossible to carry out precise processing without highly precise measurements. In particular, in the cycles of measurement and processing, in addition to performing highly precise measurements of displacement from the design value in a normal line direction of the aspheric surface, it is necessary to perform highly precise measurements of the abscissa, which is positional information on the surface to be tested.

For example, in the specification of U.S. Pat. No. 6,781,700, depending on the aspheric surface, there are cases where the drive amount v in the optical axis direction exceeds 100 mm, and it is extremely difficult to perform highly precise measurements of such a large drive amount v. Furthermore, when obtaining a position h on the surface to be tested from the drive amount v, it is assumed that all the points in a zone indicate information from positions at which lengths from the optical axis of the surface to be tested are equivalent (hereinafter referred to as equivalent radial positions). However, in a case where there is error in the spherical waves that illuminate the surface to be tested, or a case where there is distortion or the like in the optical system of the interferometer, the regions where the interference patterns become null are not necessarily limited to those according to reflected light from the equivalent radial positions on the aspheric surface, and therefore error is produced in measurements of positions on the surface to be tested.

Furthermore, in Japanese Patent Laid-Open No. 4-48201 and Japanese Patent Laid-Open No. 2000-97663, although information is necessary of the entire surface to be tested in the alignment state and the nonalignment state, no specific measurement method is disclosed in regard to aspheric surfaces. It should be noted that in the specification of U.S. patent application publication No. 2007/0201035, although information of the entire surface to be tested is not absolutely necessary, no specific measurement method is disclosed in regard to aspheric surfaces.

SUMMARY OF THE INVENTION

The present invention provides a measurement method and measurement apparatus capable of performing highly precise measurements of a figure of an aspheric surface as a surface to be tested.

According to one aspect of the present invention, there is provided a measurement method of illuminating a surface to be tested having an aspheric surface using light beams that form spherical waves, and measuring a figure of the surface to be tested, including a first detection step of performing positioning at multiple positions in order by driving the surface to be tested in a direction of an aspheric surface axis of the aspheric surface in a state in which a center of curvature of the spherical waves is on the aspheric surface axis, and detecting interference patterns between light beams from the surface to be tested and light beams from a reference surface at each of the multiple positions, a second detection step of positioning the surface to be tested at multiple shift positions at which the surface to be tested has been shifted from the multiple positions respectively by a known amount in the direction of the aspheric surface axis, and detecting interference patterns between light beams from the surface to be tested and light beams from the reference surface at each of the multiple shift positions, a first calculation step of calculating a length between a center of curvature of the spherical waves and positions on the surface to be tested at which the light beams are perpendicularly incident based on the interference patterns detected in the first detection step and the second detection step for each of the multiple positions and each of the multiple shift positions, a second calculation step of calculating change in the length based on a calculation result calculated in the first calculation step in regard to when positioning of the surface to be tested was performed at the multiple positions and when the positioning was performed at the multiple shift positions, and a third calculation step of determining positions on the surface to be tested based on the change in the lengths calculated in the second calculation step, and of calculating figure error, which is a difference between a length obtained from a design value at that position of the surface to be tested and the length calculated in the first calculation step when positioning of the surface to be tested was performed at the multiple positions.

Further aspects of the present invention will become apparent from the following description of exemplary embodiments with reference to the attached drawings.

BRIEF DESCRIPTION OF THE DRAWINGS

FIG. 3 is a diagram for describing a concept of a spherical surface at a point of interest on an aspheric surface (an arbitrary point on an aspheric surface).

DESCRIPTION OF THE EMBODIMENTS

Figure 1:
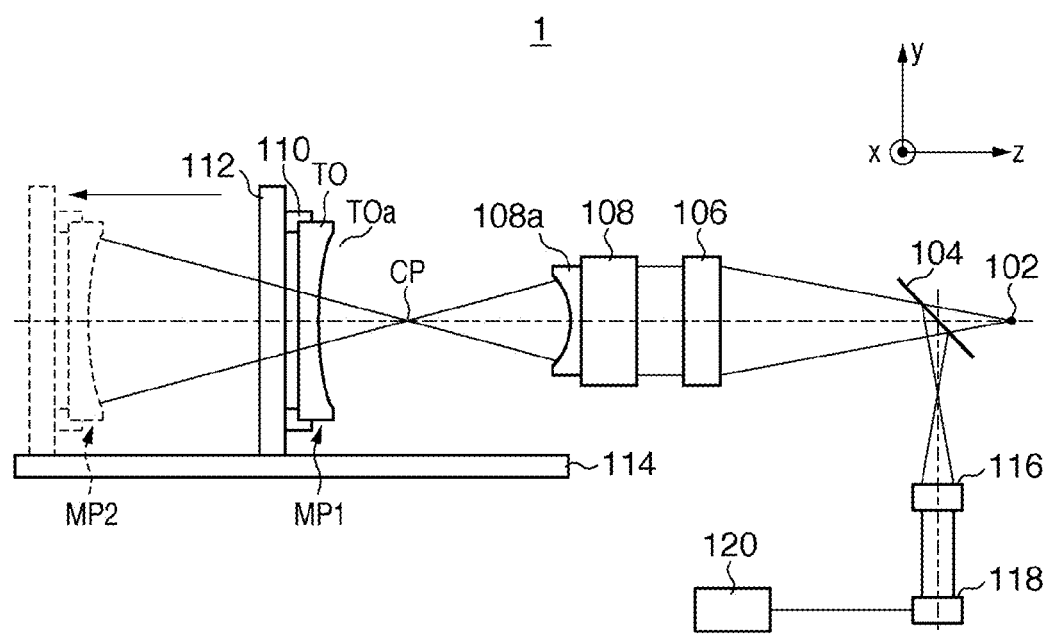
FIG. 1 is a schematic diagram showing a configuration of a measurement apparatus as one aspect of the present invention.

Various embodiments of the present invention will be described below with reference to the accompanying drawings. Note that the same reference numerals denote the same members throughout the drawings, and a repetitive description thereof will not be given.

FIG. 1 is a schematic diagram showing a configuration of a measurement apparatus 1 as one aspect of the present invention. The measurement apparatus 1 is a measurement apparatus that measures a figure of a surface to be tested by illuminating the surface to be tested, which has an aspheric surface, using light beams that form spherical waves that have passed through a reference surface, and in the present embodiment is realized as a Fizeau interferometer.

As shown in FIG. 1, the measurement apparatus 1 is provided with a light source 102, a half mirror 104, a converging lens 106, a TS lens 108, a reference surface 108a arranged on the TS lens 108, and a holder 110 that holds a test object TO having an aspheric surface as a surface TOa to be tested. Further still, the measurement apparatus 1 is provided with a 5-axis stage 112 that performs 5-axis drive on the test object TO (surface TOa to be tested) along with the holder 110, a z-axis stage 114 that drives the 5-axis stage 112 in a z direction, an imaging lens 116, a detection unit 118, and a controller 120.

Here, as shown in FIG. 1, a direction parallel to an optical axis of the TS lens 108 is set as a z axis, a direction perpendicular to the z axis on the paper surface is set as a y axis, and a direction perpendicular to the paper surface is set as an x axis. Furthermore, the degrees of freedom of the 5 axes of the 5-axis stage 112 include x, y, θx, θy, and θz. Here, θx is rotation around the x axis, θy is rotation around the y axis, and θz is rotation around the z axis. As is described later, in the present embodiment, the z-axis stage 114 has a function of performing positioning at multiple positions in order by driving the test object TO (surface TOa to be tested) in a direction of an aspheric surface axis in a state in which the optical axis of the TS lens 108 is caused to conform to an aspheric surface axis of the aspheric surface. It should be noted that "a state in which the optical axis of the TS lens 108 is caused to conform to an aspheric surface axis of the aspheric surface" may also be referred to as a state in which a center of curvature of the spherical waves is on the aspheric surface axis of the aspheric surface. Furthermore, as is described later, the z-axis stage 114 also has a function of performing positioning at multiple shift positions at which the surface TOa to be tested has been shifted by a known amount in a direction of the aspheric surface axis of the aspheric surface.

In FIG. 1, CP indicates a focal point of the TS lens 108. MP1 (solid line) indicates a position of the test object TO (the holder 110 and the 5-axis stage 112) when measuring a central area of the surface TOa to be tested, and MP2 (dotted line) indicates a position of the test object TO (the holder 110 and the 5-axis stage 112) when measuring peripheral areas of the surface TOa to be tested.

Light beams from the light source 102 are incident on the converging lens 106 via the half mirror 104. The converging lens 106 is arranged so that a length between the light source 102 and the converging lens 106 is equivalent to a focal length of the converging lens 106, and the light beams that are incident on the converging lens 106 become parallel light and are emitted.

A portion of the light beams among the light beams that are incident on the TS lens 108 are converted to spherical waves and focused on the focal point CP. And remaining light beams among the light beams that are incident on the TS lens 108 undergo normal reflection by the reference surface 108a and are incident on the half mirror 104. Hereinafter, light beams that are reflected by the reference surface 108a are referred to as reference beams.

The light beams that pass through the TS lens 108 are incident on the surface TOa to be tested of the test object TO. It should be noted that the test object TO (surface TOa to be tested) is held by the holder 110, which is arranged on the 5-axis stage 112. The 5-axis stage 112 is arranged on the z-axis stage 114, and is driven in the z axis direction along with the test object TO (surface TOa to be tested). Furthermore, a position of the 5-axis stage 112 is detected by an unshown position detection unit using a reference point of the TS lens 108 or the reference surface 108a as a reference.

Of the light beams incident on the surface TOa to be tested, light beams that are incident at a same angle as a normal line of the surface TOa to be tested undergo normal reflection by the surface TOa to be tested and are incident on the half mirror 104 via the TS lens 108 and the converging lens 106. Hereinafter, light beams that are reflected by the surface TOa to be tested are referred to as test beams.

The test beams and the reference beams that are incident on the half mirror 104 are turned perpendicularly and are incident on the detection unit 118 via the imaging lens 116. In the present embodiment, the detection unit 118 is constituted by an image sensor (a CCD or the like) having a capture surface, and captures (detects) an interference fringe (interference pattern), which is formed by interference between the test beams and the reference beams.

As is described later, in the present embodiment, interference patterns are captured (detected) while driving the test object TO (surface TOa to be tested). However, since the imaging lens 116 has a focus adjustment function, it is possible to maintain a conjugate relationship between a region to be measured on the surface TOa to be tested and the detection unit 118 even though the surface TOa to be tested is driven.

The controller 120 includes components such as a CPU and a memory, and performs overall control of the measurement apparatus 1. In particular, the controller 120 executes control of operations (processing) relating to measurements of the figure of the surface TOa to be tested, processing relating to positioning of the test object TO (surface TOa to be tested) (namely, control of the 5-axis stage 112 and the z-axis stage 114), and processing by which the figure of the surface TOa to be tested is calculated. For example, based on an interference pattern detected by the detection unit 118, the controller 120 uses a phase shift method to calculate a figure error of the surface TOa to be tested with respect to the reference surface 108a. Phase shift method refers to obtaining multiple interference patterns while varying the length between the surface TOa to be tested and the reference surface 108a by an amount several times the wavelength of the light beams from the light source 102, and calculating phase information of the interference patterns from fluctuation of these multiple interference patterns. The length between the surface TOa to be tested and the reference surface 108a can be varied by using the z-axis stage 114 to drive the test object TO (surface TOa to be tested) in the z axis direction. However, by providing a drive mechanism that drives the TS lens 108 or the reference surface 108a in the z axis direction, it is sufficient to drive the TS lens 108 or the reference surface 108a. Furthermore, it is also possible to obtain phase information by modulating the wavelengths of the light beams from the light source 102.

If the surface TOa to be tested is spherical, substantially null interference patterns are captured by causing the center of curvature position of the surface TOa to be tested to conform to the focal point CP of the TS lens 108. It should be noted that null refers to a state in which the density of interference patterns is low, and in the present embodiment refers to a state in which the number of interference patterns is not greater than one.

Since the surface TOa to be tested is an aspheric surface in the present embodiment, in a case where a paraxial center of curvature position of the surface TOa to be tested conforms to the focal point CP of the TS lens 108, interference patterns are captured in which the central area of the surface TOa to be tested is null, and the density of patterns becomes higher further towards peripheral areas. It should be noted that paraxial center of curvature refers to a center of curvature of a spherical surface for a paraxial region of an aspheric surface that is expressed as a substantial spherical surface. Furthermore, in the present embodiment, a design value of an aspheric surface is set to a rotationally symmetric aspheric surface.

Here, consideration is given in regard to an aspheric surface AP1 as a surface TOa to be tested, having an aspheric surface coefficient expressed by a paraxial curvature radius $R0=-500$ [mm], a conical coefficient $k=0.0811$, and an effective diameter $De=220$ [mm] (effective radius $he=110$ [mm]). The aspheric surface AP1 is a mirror that is applicable to a projection optical system used in a wavelength range of EUV light.

A figure z and a diameter direction size h of the aspheric surface AP1 are expressed in a relationship of expression 2 below.

$$z(h) = \frac{h^2/R0}{1 + \sqrt{1-(1+k)\cdot(h/R0)^2}} + \sum_n A_n h^n + \ldots \quad \text{(Expression 2)}$$

Furthermore, using the coordinate system shown in FIG. 1, the diameter direction size h is expressed by expression 3 below.

$$h = \sqrt{x^2 + y^2} \quad \text{(Expression 3)}$$

A first item at the right end of expression 2 indicates a quadratic curve, which is a conical curve. Furthermore, in a second item at the right end of expression 2, n is an integer and generally is an integer of 4 or more. $A_n$ is a coefficient of a component that changes with the order (n) of h. In the present embodiment, only the first item at the right end of expression 2 is used.

Figure 2:
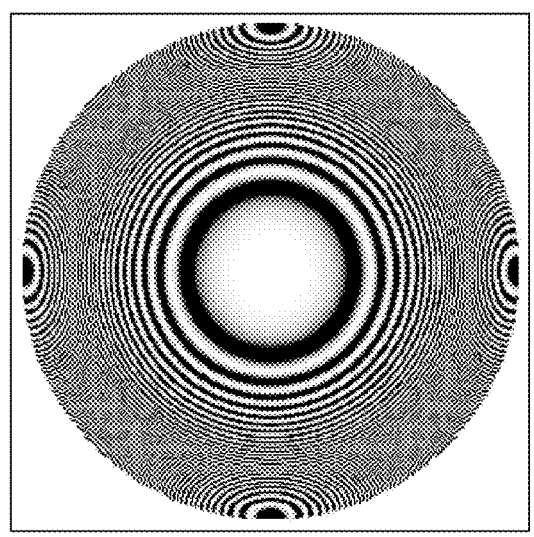
FIG. 2 is a diagram showing interference patterns in a case where an aspheric surface is measured as the surface to be tested using the measurement apparatus shown in FIG. 1.

FIG. 2 is a diagram showing interference patterns in a case where an aspheric surface AP1 is measured as the surface TOa to be tested using the measurement apparatus 1. However, the interference patterns shown in FIG. 2 are interference patterns obtained by mathematical operations. Specifically, interference patterns are calculated by obtaining a normal line direction difference between a spherical surface centering on the focal point CP of the TS lens 108 and the aspheric surface AP1, and dividing an amount two times this difference by the wavelength of the light beams from the light source 102. It should be noted that the wavelength of the light beams from the light source 102 is 633 nm.

Referring to FIG. 2, although the vicinity of the central areas is substantially null of interference patterns, interference patterns become dense further toward the peripheral areas. Since modulation (intensity ratio of adjacent pixels) deteriorates in regions where the interference patterns are dense, data is lost and measurement becomes impossible. Furthermore, even in a case where the interference patterns are resolved, the reference beams and the test beams pass through different positions of the optical system of the measurement apparatus 1 to form an image on the detection unit 118 (the capture surface of the image sensor), and therefore so-called retrace error occurs and it becomes difficult to achieve highly precise measurements.

In this way, in a case where the surface TOa to be tested is illuminated using light beams that form spherical waves, generally it is difficult to measure an entire aspheric surface as a whole. However, in a case where the position of the paraxial center of curvature of the surface TOa to be tested conforms to the focal point CP of the TS lens 108, interference patterns are substantially null only in a vicinity of the paraxial center of the surface TOa to be tested, and therefore highly precise measurements are possible. It should be noted that when driving the test object TO (surface TOa to be tested) in an optical axis direction of the reference surface 108a from a state in which the position of the paraxial center of curvature of the surface TOa to be tested conforms to the focal point CP of the TS lens 108, the regions in which interference patterns are null transition to peripheral areas.

Before describing a relationship between the surface TOa to be tested and the focal point CP of the TS lens 108 in a case where the peripheral areas become null, description is given with reference to FIG. 3 regarding a concept of a spherical surface in a position of interest of a aspheric surface (an arbitrary point on the aspheric surface). In FIG. 3, A indicates an aspheric surface as the surface TOa to be tested, and a horizontal axis h indicates a radial direction of the aspheric surface. A vertical axis z indicates a height direction and conforms to an aspheric surface axis of the aspheric surface A.

Attention is given to point Q=(hQ, zQ) on an aspheric surface A. An intersection point of a normal line of the point Q and a z axis, which is the aspheric surface axis, is given as a point CQ. Furthermore, a gradient relative to the z axis of a line portion Q-CQ, which is also a normal line of the point Q, is given as θ, and a distance (length) of the line portion Q-CQ is given as r. It should be noted that r is also a radius of curvature of a spherical surface (inscribed spherical surface) S1 that contacts the aspheric surface A at the point Q with the point CQ as a center. Furthermore, a length from a paraxial center C to the point CQ is given as p, and a center of curvature position of a paraxial region of the aspheric surface A is given as C0. In a case where the point Q is the paraxial center C of the aspheric surface A, then r=ρ=R0.

S2 is a spherical surface in which a center of curvature position is the point CQ and in which a radius is ρ, and contacts the aspheric surface A at the paraxial center C of the aspheric surface A. The spherical surface S1 and the spherical surface S2 are determined by the position of the point Q on the aspheric surface A, and although their paraxial center of curvature positions are equivalent, they are two spherical surfaces having different radii. Furthermore, V indicates a difference between ρ and R0, and p indicates a difference between ρ and r.

A radius r of curvature of the spherical surface S1 can be expressed by expression 4 below. Furthermore, the length p from the paraxial center C to the point CQ, which is the center of the spherical surface S1, can be expressed by expression 5 below.

$$r = \frac{h \cdot \sqrt{z'^2(h) + 1}}{z'(h)} \quad \text{(Expression 4)}$$

$$\rho = z(h) + \frac{h}{z'(h)} \quad \text{(Expression 5)}$$

In expression 3 and expression 4, z'(h) is obtained by differentiating the figure z of the aspheric surface with respect to h.

When the test object TO (surface TOa to be tested) is driven in the z axis direction and interference patterns at the point Q become null, a state is achieved in which the focal point CP of the TS lens 108 and the point CQ are in agreement. In other words, the interference patterns are null at a position where light beams that form spherical waves passing through the TS lens 108 (reference surface 108a) are perpendicularly incident with respect to the surface TOa to be tested.

FIGS. 4A to 4E show interference patterns when the z-axis stage 114 is used to drive the aspheric surface AP1 (surface TOa to be tested) and the interference patterns have become null at positions of 20%, 40%, 60%, 80%, and 100% the radius of an effective radius of 110 mm.

Figure 4A:
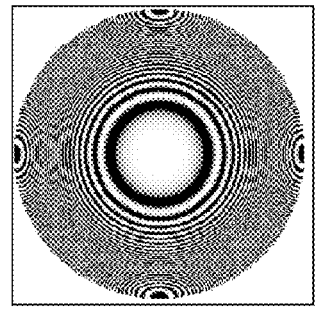
FIGS. 4A to 4E are diagrams showing interference patterns when the interference patterns have become null at positions of 20%, 40%, 60%, 80%, and 100% the radius of an effective radius of 110 mm of an aspheric surface (surface to be tested).
Figure 4B:
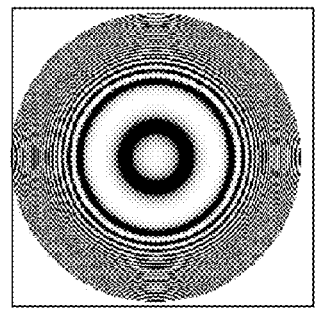
Figure 4C:
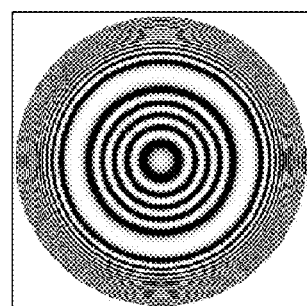
Figure 4D:
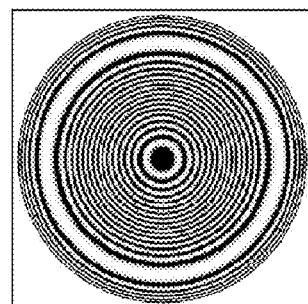
Figure 4E:
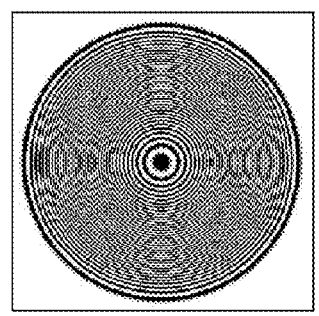

When the interference patterns of paraxial regions become null (see FIG. 2), the focal point CP of the TS lens 108 and the center of curvature position C0 (see FIG. 3) are in agreement. The interference patterns shown in FIG. 4A are interference patterns of when the aspheric surface AP1 is driven in the z axis direction by a difference V between p, which is prescribed by expression 5, and the paraxial curvature radius R0 such that the point CQ, which is the center of curvature of the spherical surface S1 where the 20% radius h=0.2 he, and the focal point CP of the TS lens 108 are in agreement. The same is true in regard to the interference patterns shown in FIGS. 4B to 4E when interference patterns of positions at 40% radius (h=0.4 he), 60% radius (h=0.6 he), 80% radius (h=0.8 he), and 100% radius (h=1.0 he) become null.

As shown in FIGS. 4A to 4E, the interference patterns are substantially null in a neighborhood of positions where light beams that form spherical waves passing through the TS lens 108 (reference surface 108a) are perpendicularly incident with respect to the surface TOa to be tested. However, the interference patterns become dense at positions other than neighborhood of positions where light beams that form spherical waves passing through the TS lens 108 (reference surface 108a) are perpendicularly incident with respect to the surface TOa to be tested. Accordingly, measurement error increases at positions other than neighborhood of positions where the light beams that form spherical waves are perpendicularly incident, and it is difficult to measure the entire surface TOa to be tested as a whole regardless of which position the surface TOa to be tested is arranged in the z axis direction.

A figure error, which is a difference of the surface TOa to be tested from the design value (design figure) is expressed as (h, Δn) using a difference Δn of the surface TOa to be tested from the design value in the normal line direction and a corresponding abscissa h.

As is described later, the figure error can be obtained from information (interference patterns) of regions at which the light beams that form spherical waves are perpendicularly incident on the surface TOa to be tested. It should be noted that the regions at which the light beams that form spherical waves are perpendicularly incident on the surface TOa to be tested are successively changed by using the z-axis stage 114 to drive the surface TOa to be tested in the z axis direction.

Specifically, using the radius r of curvature of the spherical surface S1, the figure error in the normal line direction at a measurement position (measured diameter) hm is achieved by expression 6 below.

$$\Delta n = rm - rd(hm) \quad \text{(Expression 6)}$$

In expression 6, rm is a measured value (calculated value) of r, and rd(hm) is a design value of r at the measured position hm.

First, description is given regarding a measurement method (calculation method) of rm. In the present embodiment, description is given using an example of a case where measurement is executed at h=0.6 he.

Figure 5A:
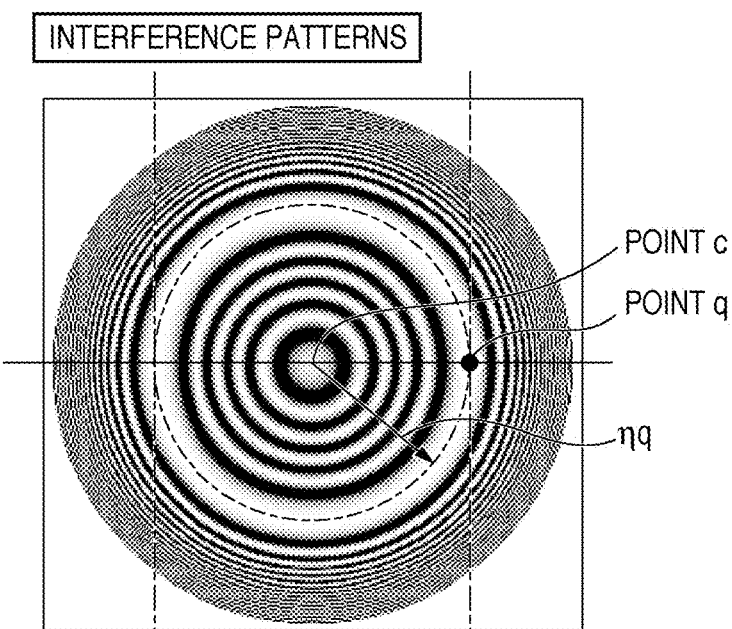
FIG. 5A and FIG. 5B are diagrams for describing a measurement method of rm in expression 6.

FIG. 5A is a diagram showing interference patterns in a case where the light beams that form spherical waves passing through the TS lens 108 (reference surface 108a) are perpendicularly incident on the surface TOa to be tested at h=0.6 he in the aspheric surface AP1. The point Q shown in FIG. 3 corresponds to h=0.6 he. Here, the test object TO (surface TOa to be tested) is arranged such that the focal point CP of the TS lens 108 and the center of curvature of the spherical surface S1 are in agreement. In this way, the light beams that form spherical waves are perpendicularly incident at the point Q. Furthermore, in the detection unit 118, the interference patterns, in which the figure of the surface TOa to be tested is reflected, are captured (detected) via the imaging lens 116.

Here, as shown in FIG. 5A, a point of a capture surface corresponding to the point Q of the surface TOa to be tested is given as a point q. Furthermore, a point of the capture surface corresponding to an image of the paraxial center of the surface TOa to be tested is given as a point c, and a length between the point c and the point q is given as ηq.

Figure 5B:
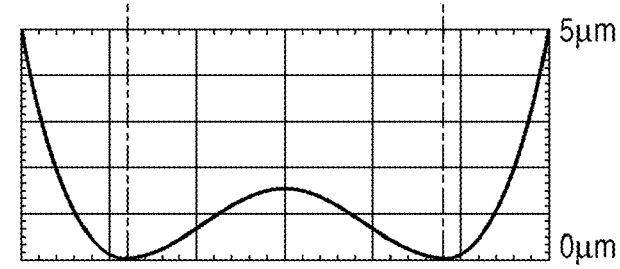

As shown in FIG. 5A, when the z-axis stage 114 is used to align the test object TO (surface TOa to be tested) with respect to the TS lens 108 (reference surface 108a), interference patterns become null at the paraxial regions of the surface TOa to be tested and the neighborhoods of zone regions of a same radius (req) as the point q. A cross section of difference in the optical path length (optical path length difference) between the spherical waves and the aspheric surface (surface TOa to be tested) in this state is shown in FIG. 5B. In reference to FIG. 5B, it is evident that in a case where there is no figure error, the optical path length difference of the point Q (h=0.6 he) where the light beams that form spherical waves are perpendicularly incident or the point q becomes zero, and the optical path length difference at peripheral areas becomes a maximum of 5 μm. Furthermore, in zone regions including the point c of the paraxial neighborhood and the point q (a circular region having a radius of ηq), the change in optical path length differences is slight, and interference patterns that are substantially null in these regions. It should be noted that the interference patterns shown in FIG. 5A are interference patterns obtained from the optical path length differences shown in FIG. 5B in calculations that take into account double passes.

And the controller 120 uses a phase shift method to calculate (measure) a figure of the surface TOa to be tested with respect to the reference surface 108a. It should be noted that the figure of the reference surface 108a is calibrated.

A measured value (calculated value) of the point q at 60% radius among a calculated result (measured result) Db of the figure of the surface TOa to be tested by the controller 120 is set as ϕq. Since calculated results according to a phase shift method of the figure of the surface TOa to be tested can only be obtained for wavelengths not greater than the light beams from the light source 102, a range of the measured values ϕq is achieved by expression 7 below in which the wavelength of the light beams from the light source 102 is given as λ.

$$-\lambda/4 < \phi q \leq \lambda/4 \quad \text{(Expression 7)}$$

On the other hand, the radius r of curvature of the spherical surface S1 is longer than the wavelength of the light beams from the light source 102, and therefore expression 7 can be rewritten as expression 8 below.

$$r = \lambda/2 \cdot nr + \phi r \quad \text{(Expression 8)}$$

In expression 8, nr is an integer, and ϕr is a value of a range (−λ/4, λ/4).

When a deviation of the surface TOa to be tested from the design value is sufficiently small (for example, a small fraction of the wavelength of the light beams from the light source 102), there is no problem when nr at the right side of expression 8 is replaced by the design value. Furthermore, as is described later, the radius r of curvature of the spherical surface S1 can also be obtained using a principle of stitching.

In expression 8, ϕr in a range smaller than λ/2 can be measured using a principle of a phase shift method, and therefore the measured value rm of r at the point Q can be expressed by expression 9 below.

$$rm = \lambda/2 \cdot nq + \phi q \quad \text{(Expression 9)}$$

It should be noted that nq is an equivalent value to nr in expression 8, and is a value obtained by calculation.

By executing calculations in a same manner for all regions in which the interference patterns are null (circular regions having a radius of ηq), the rm of regions in the zone can be calculated (measured).

Furthermore, if interference patterns are close to null in circular region neighborhoods having a radius of ηq including the point q, then rm can be calculated (measured) for points on a center side or an outer side from the point q. In this way, λ/2·nq in expression 9 (a portion of an integral multiple of ½ the wavelength of rm) can be obtained by a so-called stitching principle from information (interference patterns) of overlapping regions when measurements have been executed from the central area of the surface TOa to be tested toward the peripheral areas.

Furthermore, using a light source that emits light beams of multiple wavelengths (that is, increasing the apparent wavelength), a length g between the reference surface 108a and the surface TOa to be tested may be obtained by a principle of a so-called method of coincidence. In this case, if the radius of curvature of the reference surface 108a or a length rTS between the reference surface 108a and the focal point CP of the TS lens 108 is calibrated in advance, then $\lambda/2\cdot nq$ in expression 9 (a portion of an integral multiple of ½ the wavelength of rm) can be expressed as a portion of an integral multiple of ½ the wavelength of (g-rTS). It should be noted that the length g between the reference surface 108a and the surface TOa to be tested can be obtained by performing a Fourier transform on the interference patterns using a variable wavelength laser or by using white light interference.

Similarly, by successively driving the test object TO (surface TOa to be tested) in a direction of the aspheric surface axis of the aspheric surface and detecting interference patterns by causing the spherical surface S1 at each diameter and the focal point CP of the TS lens 108 to be in agreement, a measured value rm of r extending over the entire surface of the surface TOa to be tested can be calculated (measured).

Furthermore, the point q of positions where the interference patterns become null, that is, a position on the capture surface at which ϕr is obtained, is determined as shown below. As described above, a cross section passing through the point c at the calculated result (measured result) Db of the figure of the surface TOa to be tested is as shown in FIG. 5B. With reference to FIG. 5B, regions in which the amount of change in the phases are slight are positions at which the light beams that form spherical waves are perpendicularly incident, and therefore a position such that a first derivative in the diameter direction with respect to the calculated result Db of the figure of the surface TOa to be tested becomes zero is determined as the point q, which is the measured position. In FIG. 5B, positions at which a first derivative becomes zero are the point c and the neighborhood of h=0.6 he. It should be noted that when obtaining positions at which a first derivative becomes zero, it is also possible to use results in which a circular region having a radius of ηq fits with a polynomial. In this way, noise components can be mitigated.

Next, description is given regarding a measurement method (calculation method) of the measured position hm. In the present embodiment, description is given using an example of a case where measurement is executed at h=0.6 he.

As to the reflected light from which position on the surface TOa to be tested corresponds to the point q for calculating the measured value rm, such correspondence can be found to a certain extent from the design values of the optical system of the measurement apparatus 1, but this is insufficient in a case where the abscissa is to be determined with high precision.

Thus, as described above, in the present embodiment, first the interference patterns of a zone region including the point Q are set as null, then a figure of the surface TOa to be tested is calculated (measured) with respect to the reference surface 108a. The calculated result (measured result) at this time of the figure of the surface TOa to be tested is given as Db, and a measured position is referred to as a base position.

Next, the z-axis stage 114 is used to shift the test object TO (surface TOa to be tested) by a minute amount δz in the z axis direction (direction of the aspheric surface axis of the aspheric surface). In this state, a phase shift method is used to calculate (measure) a figure of the surface TOa to be tested with respect to the reference surface 108a. The calculated result (measured result) at this time of the figure of the surface TOa to be tested is given as Ds, and the measured position is referred to as a Z shift position. It should be noted that the detection sensitivity of the abscissa deteriorates when the minute amount δz is small, and that the interference patterns become too dense when this is large such that the precision of measurements is affected. The number of pixels in practical capture systems is approximately 500×500 to 4,000×4,000, and therefore the minute amount z is not less than 10 times and not greater than 500 times the wavelength of the light beams from the light source 102.

When a difference between the calculated result Db of the base position and the calculated result Ds of the Z shift position is given as Dn, a relationship between Dn and the minute amount δz is expressed by expression 10 below.

$$Dn=Ds-Db=\delta z \cdot (1-\text{Sqrt}[1-NA(h)^2])\quad\text{(Expression 10)}$$

It should be noted that Sqrt [ ] indicates a square root of the figure inside the [ ]. NA is a numerical aperture of h and is expressed as a function of h. Furthermore, when the angle of the normal line is given as θ, NA=sin θ.

Furthermore, when a design figure of the aspheric surface is given as z(h), the angle θ of the normal line can be expressed by expression 11 below.

$$\theta=\tan^{-1}z'(h)\quad\text{(Expression 11)}$$

The minute amount δz for shifting in the z axis direction can be measured using an unshown positional detection unit, and a difference Dn can be calculated from the calculated results Db and Ds. Accordingly, if expression 10 is used, a point of interest on the capture surface (for example, point q) and an abscissa h on the surface TOa to be tested (for example, point Q) can be made to correspond based on the difference Dn and the minute amount δz.

Figure 6A:
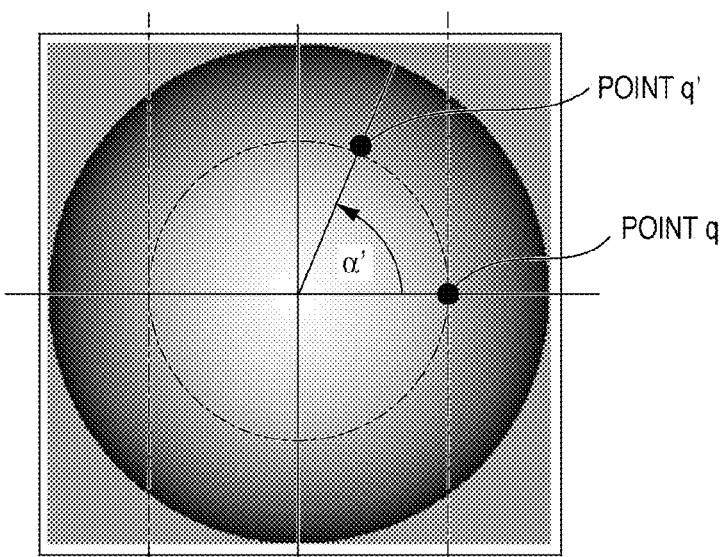
FIG. 6A and FIG. 6B are diagrams for describing a difference between a calculated result of a base position and a calculated result of a Z shift position.
Figure 6B:
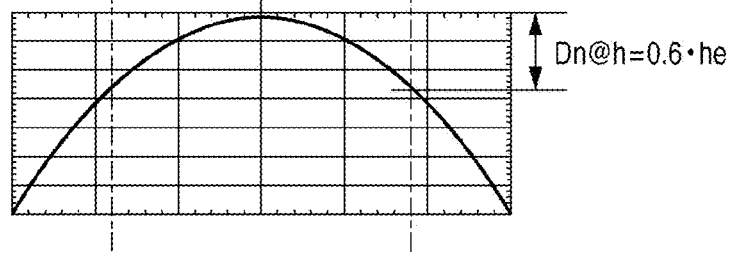

FIG. 6A and FIG. 6B are diagrams for describing the difference Dn between the calculated result Db of the base position and the calculated result Ds of the Z shift position. FIG. 6A shows a map of the differences Dn between the calculated result Db of the base position and the calculated result Ds of the Z shift position on the capture surface, and FIG. 6B shows a cross section of the map shown in FIG. 6A. It should be noted that positions where the interference patterns become null for 60% of an effective radius are set as the base positions and δz=10 μm.

In reference to FIG. 6A and FIG. 6B, at the point q, which is a point corresponding to the point Q on the surface TOa to be tested, a change of Dn=−235.9 nm is produced. In fact, δz=10 μm is obtained from the positional detection unit and the difference Dn=−235.9 nm is obtained from interference patterns of the base position and the Z shift position. Accordingly, using the design values of the surface TOa to be tested and expression 10, it is possible to obtain the abscissa (position) h=0.6 he of the surface TOa to be tested corresponding to the point q on the capture surface.

By executing these calculations in a same manner with respect to all the points on the capture surface, it is possible to calculate an abscissa hm on the surface TOa to be tested corresponding to rm.

Furthermore, when a lateral direction on the paper plane in FIG. 6A is the x axis, for a point of interest on the capture surface, such as the point q' whose length from the center is the same as the point q, and that is an α angle from the x axis, expressing that point by Cartesian coordinates (xmq', ymq') on the surface TOa to be tested is considered. When it is found that the point q' is a radius of hmq on the surface TOa to be tested by using expression 10, the Cartesian coordinates (xmq', ymq') on the surface TOa to be tested can be determined from a relationship shown in expression 12 below.

$$xmq'=hmq\cdot\cos\alpha,\ ymq'=hmq\cdot\sin\alpha\quad\text{(Expression 12)}$$

Similarly, by successively driving the test object TO (surface TOa to be tested) in a direction of the aspheric surface axis of the aspheric surface and setting a state in which the center of curvature of the spherical surface S1 at each diameter and the focal point CP of the TS lens 108 are caused to be in agreement as the base positions, the abscissas hm are measured successively. In this way, abscissas extending over the entire surface of the surface TOa to be tested can be calculated (measured).

Furthermore, the difference Dn between the calculated result Db of the base position and the calculated result Ds of the Z shift position is approximated by expression 13 in regions where the NA is small.

$$Dn \approx \delta z \cdot NA(h)^2/2 \quad \text{(Expression 13)}$$

In reference to expression 13, in regions where the NA in the paraxial center neighborhood of the surface TOa to be tested is small, the difference Dn between the calculated result Db of the base position and the calculated result Ds of the Z shift position changes by NA squared. Accordingly, in a case where the change in the difference Dn with respect to $\delta z$ is small and expression 10 is used, the measurement precision worsens for positions on the surface TOa to be tested.

The optical performance in paraxial regions of optical systems of interferometers can be improved in design and also in manufacture, and therefore, only for the paraxial center neighborhood, the correspondence of the abscissa on the surface TOa to be tested can be carried out based on the design values of the optical system of the interferometer. For example, when an imaging scaling ratio between the surface TOa to be tested and the detection unit 118 (capture surface) is given as β, the coordinates on the surface TOa to be tested are given as hp, and the coordinates on the capture surface are given as $h_{CCD}$, a relationship shown in expression 14 below is established.

$$hp = \beta \cdot h_{CCD} \quad \text{(Expression 14)}$$

In regard to the paraxial center neighborhood of the surface TOa to be tested, the abscissa can be determined using expression 14. It should be noted that it is also possible to calibrate the abscissa in advance using a standard or the like for abscissas.

A design value rd of r at the measured position hm on the surface TOa to be tested obtained in this manner is expressed by expression 15 below by substituting hm in expression 4.

$$rd(hm) = \frac{hm \cdot \sqrt{z'^2(hm)+1}}{z'(hm)} \quad \text{(Expression 15)}$$

As has been described up until here, the controller 120 can obtain rm, hm=(xm, ym) and rd (hm) based on interference patterns detected by the detection unit 118. In this way, it becomes possible to express the figure error Δn of the surface TOa to be tested corresponding to coordinates (abscissas) on the surface TOa to be tested.

Figure 7:
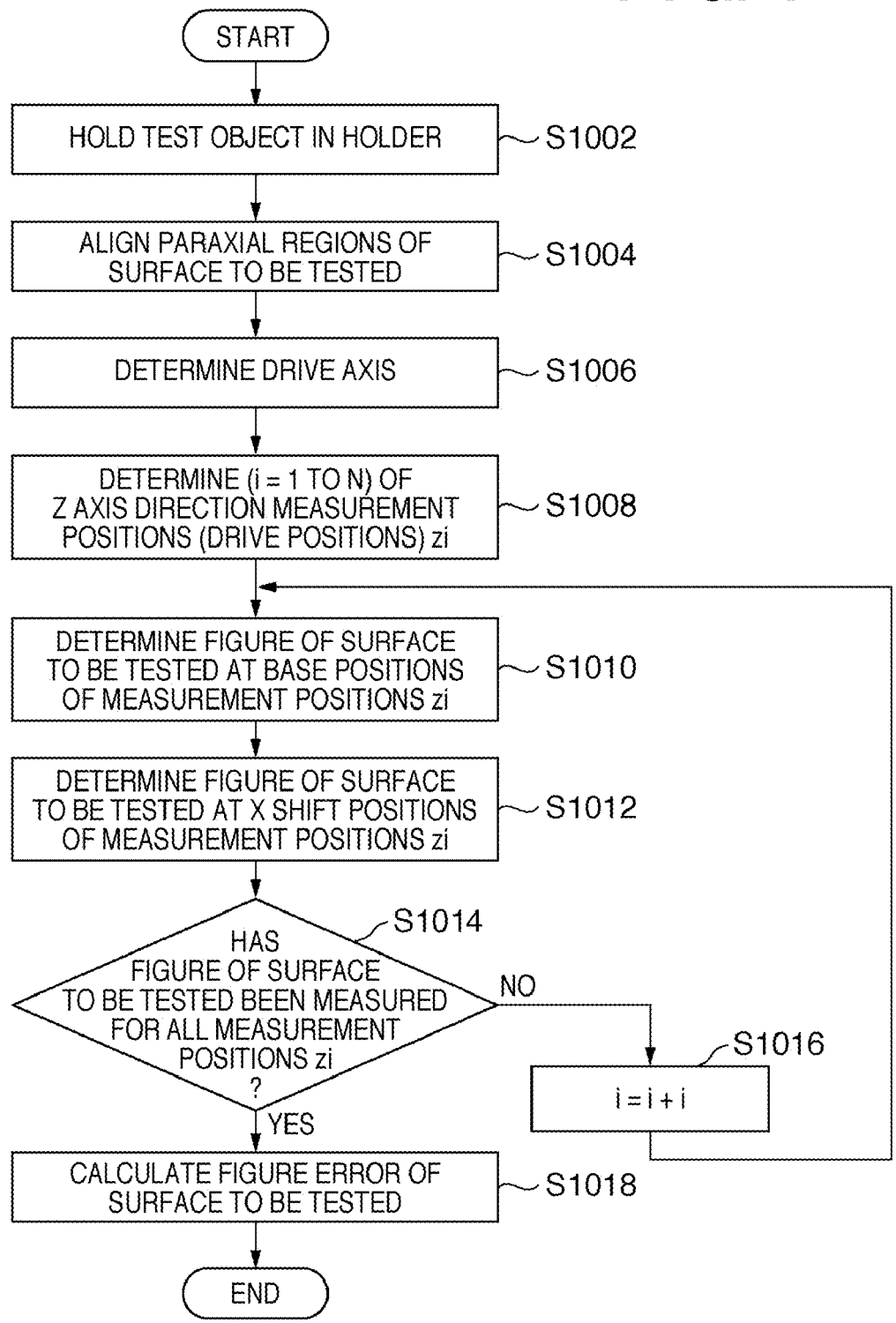
FIG. 7 is a flowchart for describing a measurement process of the measurement apparatus shown in FIG. 1.

Hereinafter, description is given with reference to FIG. 7 regarding measurement processing by the measurement apparatus 1. This measurement processing is processing in which a figure of the surface TOa to be tested of the test object TO (a figure of the entire surface of the measurement region) is measured, and is executed by the controller 120 comprehensively controlling each unit of the measurement apparatus 1.

At step S1002, the test object TO is caused to be held in the holder 110.

At step S1004, the 5-axis stage 112 and the z-axis stage 114 are used to align the surface TOa to be tested with respect to the TS lens 108 such that interference patterns of paraxial regions of the surface TOa to be tested of the test object TO become null. Here, when alignment is executed so that components that change as a quadric of the diameter of rotationally symmetric components of phase components in paraxial regions of the surface TOa to be tested become zero, the paraxial center of curvature position of the surface TOa to be tested (C0 shown in FIG. 3) and the focal point CP of the TS lens 108 can be caused to be in agreement. Here, the position of the surface TOa to be tested at step S1004 is used as an origin of coordinate system in later steps. However, in relation to z of the origin, a position at which so-called cat's eye measurements can be achieved may be set as the origin of z by arranging the surface TOa to be tested in a position of the focal point CP of the TS lens 108.

At step S1006, a drive axis of the test object TO (surface TOa to be tested) is determined. The drive axis here is determined so that all the zone regions including paraxial regions become null when the surface TOa to be tested is driven along the drive axis.

For example, the test object TO (surface TOa to be tested) is driven to a position where outermost perimeter interference patterns become null, and 5-axis values are stored so that so-called tilt components among phase components of zone regions become smallest. Here, 5-axis refers to x, y, z, θx, and θy, excluding θz. Then, a straight line determined based on 5-axis values for which the tilt components become smallest and 5-axis values for which components that change as a quadric of the diameter for which alignment was executed at step S1004 become zero is set as the drive axis.

Furthermore, if 5-axis values that express positions of the surface TOa to be tested are determined for at least two points, then it becomes possible to determine the drive axis, and therefore, for example, a pair of 5-axis values in which tilt components become smallest at 10% of the radius and 80% of the radius may be obtained to determine the drive axis.

Furthermore, the points at which tilt components are measured may be increased to 3 or 4 points to obtain 5-axis values at which tilt components at each point become smallest to determine the drive axis using a smallest square technique.

It should be noted that in the present embodiment the z-axis stage 114 drives the test object TO (surface TOa to be tested) parallel to the optical axis of the TS lens 108 (that is, the optical axis of the TS lens 108 and the z axis are in agreement), and x and y of the 5-axis stage 112 are perpendicular to the z axis. Generally, the axes of the apparatus and the optical axis are not in agreement, but the drive axis of the test object TO (surface TOa to be tested) determined in the present embodiment is in agreement with the optical axis of the TS lens 108. Accordingly, it is also possible to execute calibration of the coordinate axes (6 axes) of the measurement apparatus 1 based on the drive axis. The calibration of the coordinate axes may be executed at step S1006 or may be executed in advance.

At step S1008, based on the design values of the surface TOa to be tested and the drive axis determined at step S1006, a position to drive the test object TO (surface TOa to be tested) in the z axis direction, namely, a measured position zi is determined. Here, i is an integer of 1 to N, and N is a number of mutually different measured positions. Furthermore, it is preferable that N is determined so that the entire surface of the surface TOa to be tested can be measured with a sufficient sampling precision, for example, approximately 100 to 1,000.

Measurement (calculation) of the figure of the surface TOa to be tested and the abscissa is executed at each measurement position zi. The measurement positions zi may be determined so that the zone regions at which the interference patterns become null have regular spacings in the coordinates of the surface TOa to be tested, or may be determined so that drive amounts in the z axis direction become uniform.

At step S1010, the z-axis stage 114 is used to arrange the test object TO (surface TOa to be tested) at the base position of the measurement position zi, and a figure of the surface TOa to be tested is measured with respect to the reference surface 108a. Here, the base position refers to a position at which the interference patterns become null in a zonal shape. Furthermore, the figure of the reference surface 108a may be calibrated in advance.

As described above, a phase shift method is used to execute measurements of the figure of the surface TOa to be tested. At each of the measurement positions zi, the regions at which the interference patterns become null on the capture surface change as shown in FIGS. 4A to 4E in accordance with change in the positions at which the light beams that form spherical waves passing through the TS lens 108 (reference surface 108a) are perpendicularly incident. It should be noted that measured results of the measurement positions zi in step S1010 are set as Dbi.

At step S1012, the z-axis stage 114 is used to arrange the test object TO (surface TOa to be tested) at the Z shift position by shifting it from the base position of the measurement position zi in the z axis direction by the known minute amount δz, and a figure of the surface TOa to be tested is measured with respect to the reference surface 108a. It should be noted that measured results at step S1012 are set as Dsi.

At step S1014, a determination is performed as to whether or not measurements have been performed of the figure of the surface TOa to be tested for all the measurement positions zi (that is, whether or not the measurements of step S1010 and S1012 have been executed).

If measurements have not been performed of the figure of the surface TOa to be tested for all the measurement positions zi, then i=i+1 is performed (step S1016) to measure the figure of the surface TOa to be tested at a next measurement position zi, and the procedure returns to step S1010. On the other hand, if the figure of the surface TOa to be tested has been measured for all the measurement positions zi, then the procedure proceeds to step S1018.

In this manner, at step S1010, the surface TOa to be tested is driven in the direction of the aspheric surface axis and positioned in order at (base positions of) multiple measurement positions, and interference patterns are obtained for these base positions respectively (first detection step). Furthermore, at step S1012, the surface TOa to be tested is positioned in the multiple shift positions, which are shifted from the base position in the direction of the aspheric surface axis by a known amount, and interference patterns are obtained for these multiple shift positions respectively (second detection step).

At step S1018, the figure error $\Delta n$ (hm) of the surface TOa to be tested from the design value is calculated. Based on the design values of the surface TOa to be tested, and the measured results Dbi and Dsi, the figure error $\Delta n$ is calculated by obtaining a measured value rm of r, a measured position hm on the surface TOa to be tested corresponding to the measured value rm, and a design value rd (hm) of r at the measured position hm.

Specifically, a phase $\phi r$ of the positions (point q and the like shown in FIG. 5A) at which the interference patterns become substantially null is extracted from the measured result Dbi at step S1010, an rm is calculated using expression 9 (first calculation step).

Furthermore, a difference is calculated between the measured result Dsi in step S1012 and the measured result Dbi in step S1010. In other words, a change Dni is calculated in the rm of when the surface TOa to be tested was positioned at the base position of the measurement apparatus and of when it was positioned at the shift position (second calculation step). Then a position hmq=(xmq, ymq) on the surface TOa to be tested corresponding to the point q on the capture surface of the detection unit 118 is calculated from the difference Dni between the measured result Dsi in step S1012 and the measured result Dbi in step S1010 using expression 10 and expression 12.

Further still, expression 15 is used to calculate a design value rd(hm) of r at the measured position hm from the position hmq=(xmq, ymq) of the surface TOa to be tested. Then, a difference between rm and rd(hm) is calculated using expression 6, and the calculated result is set as the figure error $\Delta n$ at the position hmq=(xmq, ymq) on the surface TOa to be tested (third calculation step).

The above-described operations are executed for all positions (points) of regions in which interference patterns are substantially null. In this way, the figure error $\Delta n$ and corresponding positions on the surface TOa to be tested are calculated for each measurement position. It should be noted that the figure error $\Delta n$ calculated at each measurement position may be expressed in a 3-dimensional manner, (x, y, $\Delta n$), using the coordinates (x, y) on the surface TOa to be tested. In this way, figure error can be expressed extending over the entire surface of the surface TOa to be tested.

It should be noted that at step S1012, the figure of the surface TOa to be tested is measured at the Z shift position, which is shifted from the base position in the z axis direction by the known minute amount δz. However, by appropriately determining the measurement positions zi at step S1008 (by making the length between the measurement positions zi equivalent to the known minute amount δz), the abscissa can be calculated (determined) using the measured result at the measurement position zi and the measured result at a previous measurement position z(i−1).

Specifically, when δz=z(i−1)−zi is set, and the measured result of the measurement position zi is set to Dbi, and the measured result at the measurement position z(i−1) is set to Db(i−1), then a relationship shown in expression 16 below is established in a same manner as expression 10.

$$Dn=Dbi-Db(i-1)=\delta z \cdot (1-\mathrm{Sqrt}[1-\mathrm{NA}(h)^2]) \qquad \text{(Expression 16)}$$

Accordingly, it is possible to calculate (measure) the measurement positions on the surface TOa to be tested.

In this case, it becomes possible to omit step S1012, and the time (measurement time) for measuring the figure of the surface TOa to be tested can be shortened. It should be noted that whether or not the lengths between the measurement positions zi can be made equivalent to the known minute amount δz is dependent on the design value of the surface TOa to be tested and the measurement precision (the sampling intervals on the surface TOa to be tested).

In this way, with the present embodiment, positions on a surface to be tested can be calculated (measured) without using drive amounts of the surface to be tested or an optical path length difference between positions at which the interference patterns become null in a zonal manner and paraxial center positions, and therefore highly precise measurements can be achieved for the figure of an aspheric surface as a surface to be tested.

Up until now description has been given regarding a case where the test object TO (surface TOa to be tested) was shifted in the z axis direction (direction of the aspheric surface axis of the aspheric surface) to measure (calculate) measured positions hm on the surface TOa to be tested. However, by shifting the test object TO (surface TOa to be tested) in the x axis direction and the y axis direction (directions perpendicular to the aspheric surface axis of the aspheric surface), it is also possible to measure (calculate) measured positions hm on the surface TOa to be tested.

Hereinafter, description is given regarding a case where the test object TO (surface TOa to be tested) is shifted in the x axis direction and the y axis direction (directions perpendicular to the aspheric surface axis of the aspheric surface) to measure (calculate) measured positions hm on the surface TOa to be tested. In the present embodiment, description is given using an example of a case where measurement is executed at h=0.6 he.

As described above, in the present embodiment, first the interference patterns of a zone region including the point Q are set as null, then a figure of the surface TOa to be tested is calculated (measured) with respect to the reference surface 108a. The calculated result (measured result) at this time of the figure of the surface TOa to be tested is given as Db, and a measured position is referred to as a base position. Furthermore, a data acquisition point on the capture surface that captures interference patterns is set to a point q'=(ηq·cos α, ηq·sin α) and in particular a calculation result of the point q' on the capture surface is assigned a subscript q' and set to Dbq'. Here, α is an orientation within the capture surface.

Next, the 5-axis stage 112 is used to shift the test object TO (surface TOa to be tested) by a minute amount δx in an x axis direction perpendicular to the z axis direction (direction perpendicular to the aspheric surface axis of the aspheric surface). In this state, a phase shift method is used to calculate (measure) a figure of the surface TOa to be tested with respect to the reference surface 108a. The calculated result (measured result) at this time of the figure of the surface TOa to be tested is given as Dx, and the measured position is referred to as a X shift position. Furthermore, the calculation result of the point q' on the capture surface is assigned the subscript q' and is set as Dxq'. It should be noted that the detection sensitivity of the abscissa deteriorates when the minute amount δx is small, and that the interference patterns become too dense when this is large such that the precision of measurements is affected. The number of pixels in practical capture systems is approximately 500×500 to 4,000×4,000, and therefore the minute amount δx is not less than 10 times and not greater than 500 times the wavelength of the light beams from the light source 102.

When a difference between the calculated result Dbq' of the base position at the point q' on the capture surface and the calculated result Dxq' of the X shift position is given as Dnxq', a relationship between Dnxq' and the minute amount δx is expressed by expression 17 below.

$$Dnxq'=Dxq'-Dbq'=\delta x \cdot NA(hq') \cdot \cos \gamma \quad \text{(Expression 17)}$$

It should be noted that NA is a numerical aperture of h and is expressed as a function of h. Furthermore, when the angle of the normal line is given as θ, NA=sin θ. γ is an orientation of the point q' on the surface TOa to be tested when the x axis in the (x,y) plane is set as the standard. hq' is a position on the surface TOa to be tested corresponding to the position q' on the capture surface, and hq'=|hq'|·(cos γ, sin γ)·|hq'| is a radius.

Furthermore, when a design figure of the aspheric surface is given as z(h), the angle θ of the normal line can be expressed by expression 11 as described above.

Similarly, from a state in which the test object TO (surface TOa to be tested) is arranged at the base position, the 5-axis stage 112 is used to shift the test object TO (surface TOa to be tested) by a minute amount δy in a y axis direction perpendicular to the z axis direction (direction perpendicular to the aspheric surface axis of the aspheric surface). In this state, a phase shift method is used to calculate (measure) a figure of the surface TOa to be tested with respect to the reference surface 108a. The calculated result (measured result) at this time of the figure of the surface TOa to be tested is given as Dy, and the measured position is referred to as a Y shift position. Furthermore, the calculation result of the point q' on the capture surface is assigned the subscript q' and is set as Dyq'. It should be noted that the minute amount δy is preferably not less than 10 times and not greater than 500 times the wavelength of the light beams from the light source 102, and is approximately equivalent to the minute amount δx.

When a difference between the calculated result Dbq' of the base position at the point q' on the capture surface and the calculated result Dyq' of the Y shift position is given as Dnyq', a relationship between Dnyq' and the minute amount δy is expressed by expression 18 below.

$$Dnyq'=Dyq'-Dbq'=\delta y \cdot NA(hq') \cdot \sin \gamma \quad \text{(Expression 18)}$$

In expression 17 and expression 18, |hq'| of hq'=|hq'|·(cos γ, sin γ) and γ are unknown variables, and δx and δy are known amounts, while Dnxq' and Dnyq' are figure differences before shifting and after shifting the surface TOa to be tested. Accordingly, by solving expression 17 and expression 18 simultaneously, it is possible to obtain a position hq'=|hq'|·(cos γ, sin γ) on the surface TOa to be tested corresponding to the point q' on the capture surface.

For example, the item γ can be deleted from expression 17 and expression 18 to achieve expression 19 below.

$$NA(hq')=\text{Sqrt}[(Dnxq'/\delta x)^2+(Dnyq'/\delta y)^2] \quad \text{(Expression 19)}$$

It should be noted that Sqrt [ ] indicates a square root of the figure inside the [ ].

Since the NA is a function of h, |hq'| can be obtained by solving expression 19, and by substituting this |hq'| into expression 17 and expression 18, an orientation γ of the point q' on the surface TOa to be tested can be obtained.

Figure 8A:
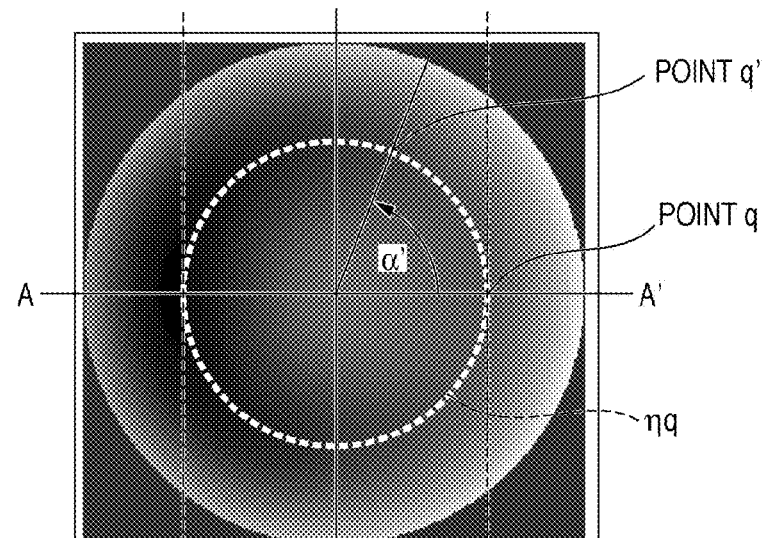
FIGS. 8A to 8C are diagrams showing one example of calculated results (measured results) of a figure of a surface to be tested at an X shift position.
Figure 8B:
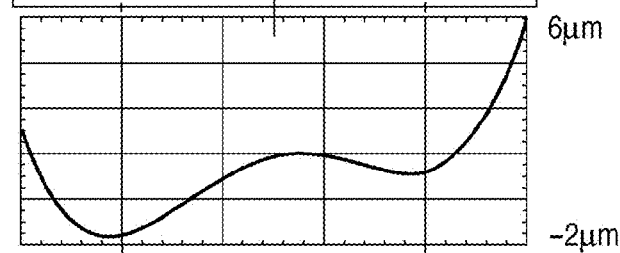
Figure 8C:
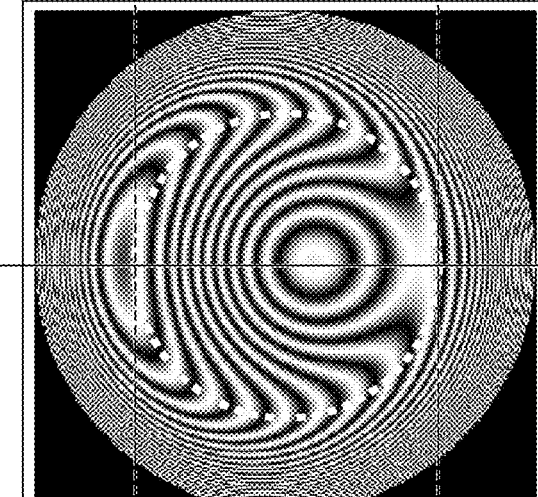

Below, an example of numerical values is shown. FIGS. 8A to 8C are diagrams showing one example of calculated results (measured results) Dx of a figure of a surface TOa to be tested at the X shift position. FIG. 8A shows a map of calculated results (measured results) Dx of a figure of the surface TOa to be tested on the capture surface, and FIG. 8B shows a cross section of the map shown in FIG. 8A. It should be noted that positions where the interference patterns become null for 60% of an effective radius are set as the base positions and δx=10 μm is set. FIG. 8C shows interference patterns based on the map shown in FIG. 8A. Furthermore, A-A' is in agreement with the x axis, which is the shift direction of the surface TOa to be tested. In reference to FIGS. 8A to 8C, it is evident that tilt patterns originating in the shift to the x axis direction occur with respect to the measurements of the base positions (see FIG. 5A and FIG. 5B).

Figure 9A:
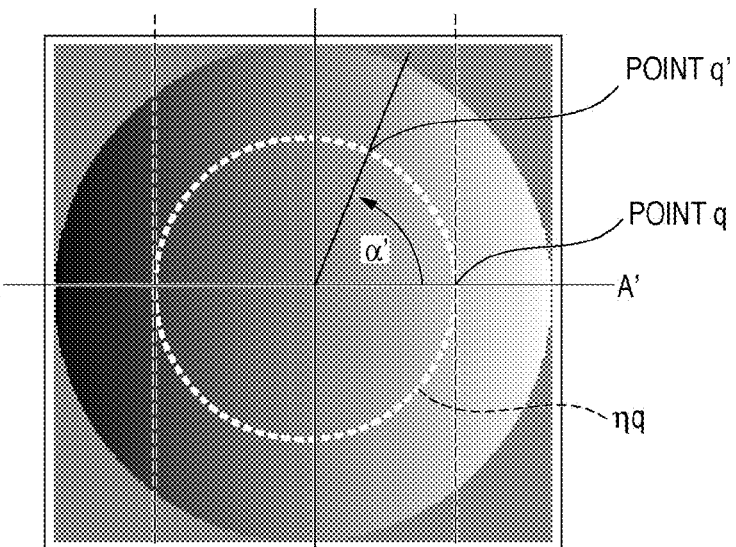
FIG. 9A and FIG. 9B are diagrams showing a difference between a calculated result (measured result) of a figure of the surface to be tested at the base positions and calculated results (measured results) of a figure of the surface to be tested at shift positions.
Figure 9B:
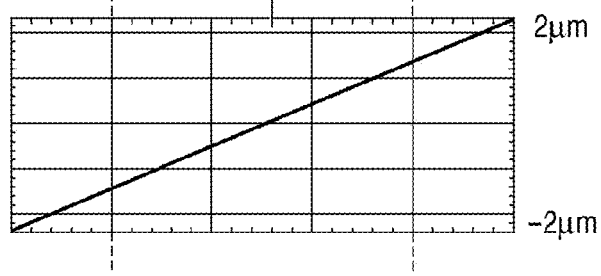

FIG. 9A and FIG. 9B are diagrams showing a difference Dnx between a calculated result (measured result) of a figure of the surface TOa to be tested at the base positions and calculated results (measured results) of a figure of the surface TOa to be tested at X shift positions. FIG. 9A shows a map of the differences Dnx on the capture surface, and FIG. 9B shows a cross section of the map shown in FIG. 9A. In FIG. 9A, A-A' corresponds to the x axis direction.

In reference to FIG. 9A and FIG. 9B, a change (Dnxq) in the figure of the surface TOa to be tested before and after shifting of the point q on A-A' is 1321.0 nm. When the orientation y on the surface TOa to be tested and the angle α' are equivalent, the change (Dnxq') in the figure of the surface TOa to be tested before and after shifting of the point q', which is on a same radius as point q at an angle α' with respect to the x axis, is 1321.0×cos α'. For example, in a case where α'=45 degrees, the change in the figure of the surface TOa to be tested before and after the shifting of point q' is 934.1 nm. Furthermore, in a case where α'=90 degrees, the change in the figure of the surface TOa to be tested before and after the shifting of point q' is 0.0 nm.

Figure 10:
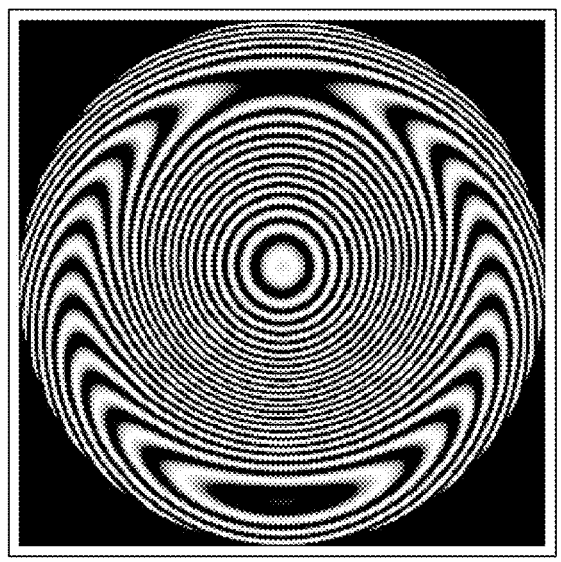
FIG. 10 is a diagram showing one example of calculated results (measured results) of a figure of a surface to be tested at a Y shift position.

Also, in a case where the test object TO (surface TOa to be tested) has been shifted by δy in the y axis direction, as shown in FIG. 10, interference patterns can be obtained rotated 90 degrees with respect to the interference patterns (see FIG. 8C) when it has been shifted by δx in the x axis direction. Here, FIG. 10 is a diagram showing one example of calculated results (measured results) Dy of a figure of a surface TOa to be tested at a Y shift position.

Figures 11A, 11B:
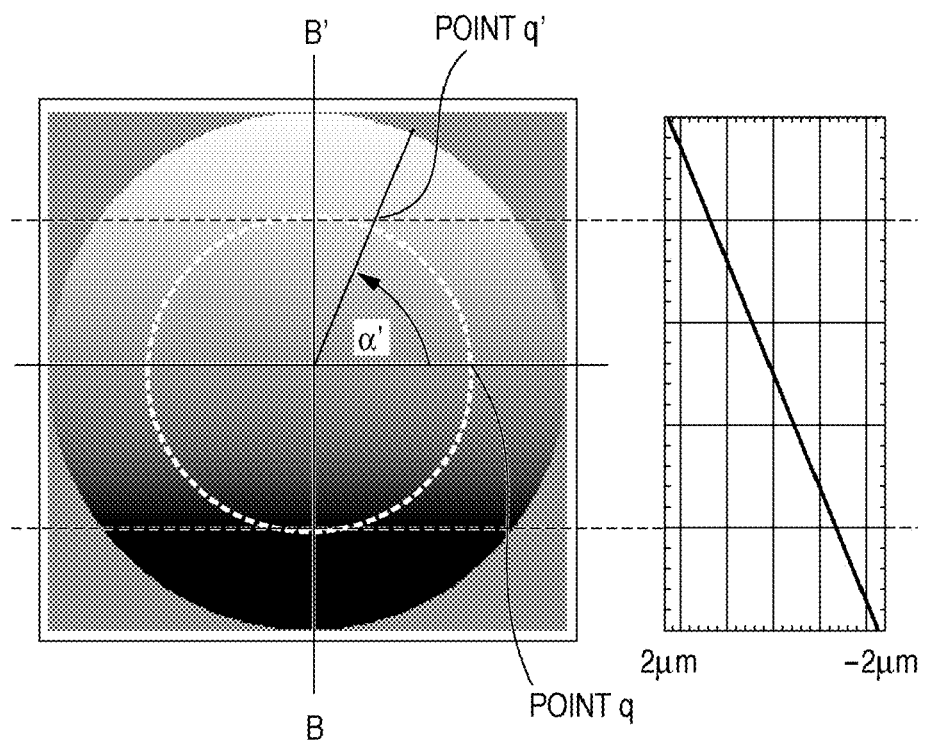
FIG. 11A and FIG. 11B are diagrams showing a difference between a calculated result (measured result) of a figure of the surface to be tested at the base positions and calculated results (measured results) of a figure of the surface to be tested at Y shift positions.

FIG. 11A and FIG. 11B are diagrams showing a difference Dny between a calculated result (measured result) of a figure of the surface TOa to be tested at the base positions and calculated results (measured results) of a figure of the surface TOa to be tested at Y shift positions. FIG. 11A shows a map of the differences Dny on the capture surface, and FIG. 11B shows a cross section of the map shown in FIG. 11A. In FIG. 11A, B-B' corresponds to the y axis direction. It should be noted that δy=10 μm is set.

In reference to FIG. 11A and FIG. 11B, a change (Dnyq) in the figure of the surface TOa to be tested before and after shifting of the point q on B-B' is 0.0 nm since the angle with respect to the x axis is zero degrees. Furthermore, when the orientation y on the surface TOa to be tested and the angle α' are equivalent, the change (Dnyq') in the figure of the surface TOa to be tested before and after shifting of the point q', which is on a same radius as the point q at an angle α' with respect to the x axis, is 1321.0×sin α'. For example, in a case where α'=45 degrees, the change in the figure of the surface TOa to be tested before and after the shifting of point q' is 934.1 nm. Furthermore, in a case where α'=90 degrees, the change in the figure of the surface TOa to be tested before and after the shifting of point q' is 1321.0 nm.

In this way, when giving attention to points of α'=45 degrees as points on the capture surface, the position of the point q' on the surface to be tested or that the radius |hmq'| is 60% of the effective radius can be calculated from δx=δy=10 μm and Dnxq'=Dnyq'=934.1 nm using expression 19.

Further still, to express the position hmq' on the surface to be tested as Cartesian coordinates (xmq', ymq') on the surface to be tested, |hmq'| may be substituted into expression 17 or expression 18 to obtain the orientation γ on the surface TOa to be tested. Specifically, when the position hmq' on the surface to be tested is expressed as Cartesian coordinates (xmq', ymq') on the surface to be tested, expression 20 below is achieved.

$$hmq'=(xmq',ymq')=|hmq'|\cdot(\cos\gamma,\sin\gamma) \quad \text{(Expression 20)}$$

In the present embodiment, positions on the surface TOa to be tested are calculated using not only information of the orientation (angle α') on the capture surface, but also based on the shift amounts (δx and δy) of the surface TOa to be tested and the differences (Dnx and Dny) of the figure of the surface TOa to be tested on the capture surface before and after shifting. Accordingly, it is possible to calculate positional information on the surface TOa to be tested with high precision.

By executing these calculations in a same manner with respect to all the points on the capture surface, it is possible to calculate an abscissa hm on the surface TOa to be tested corresponding to rm.

Furthermore, by successively driving the test object TO (surface TOa to be tested) in a direction of the aspheric surface axis of the aspheric surface and setting a state in which the center of curvature of the spherical surface S1 at each diameter and the focal point CP of the TS lens 108 are caused to be in agreement as the base positions, the abscissas hm are measured successively by shifting the surface TOa to be tested in the x axis direction and the y axis direction. In this way, abscissas extending over the entire surface of the surface TOa to be tested can be calculated (measured).

It should be noted that in the present embodiment, the surface TOa to be tested is shifted in two directions orthogonal to each other of the x axis direction and the y axis direction. However, by calibrating in advance a relationship between the orientation (angle α') of the point q' on the capture surface and the orientation γ on the surface TOa to be tested, the abscissas can also be calculated by shifting the surface TOa to be tested in only one direction.

For example, consider a case where the surface TOa to be tested is shifted in only the x axis direction. A difference between a calculated result (measured result) of a figure of the surface TOa to be tested at the base positions and calculated results (measured results) of a figure of surface TOa to be tested at X shift positions at the point q' on the capture surface is expressed by expression 17, and by substituting γ with α', expression 21 below is achieved.

$$Dnxq'=Dxq'-Dbq'=\delta x\cdot NA(hq')\cdot\cos\alpha' \quad \text{(Expression 21)}$$

In expression 21, the orientation (angle α') on the capture surface corresponding to the position rm is a known amount, and since the NA is a function of |hq'|, only |hq'| is a variable.

When expression 15 is solved with respect to |hq'| based on design values, the abscissas on the surface TOa to be tested can be calculated as expressed by expression 22 below.

$$hmq'=|hq'|\cdot(\cos\alpha',\sin\alpha') \quad \text{(Expression 22)}$$

It should be noted in regard to a case where the surface TOa to be tested is shifted in only the y axis direction that expression 18 may be used instead of expression 17.

As described above, a design value rd of r at the measured position hm on the surface TOa to be tested obtained in this manner is expressed by expression 15 by substituting in hm in expression 4.

As has been described up until here, the controller 120 can obtain rm, hm=(xm, ym) and rd (hm) based on interference patterns detected by the detection unit 118. In this way, it becomes possible to express the figure error Δn of the surface TOa to be tested corresponding to coordinates (abscissas) on the surface TOa to be tested.

Figure 12:
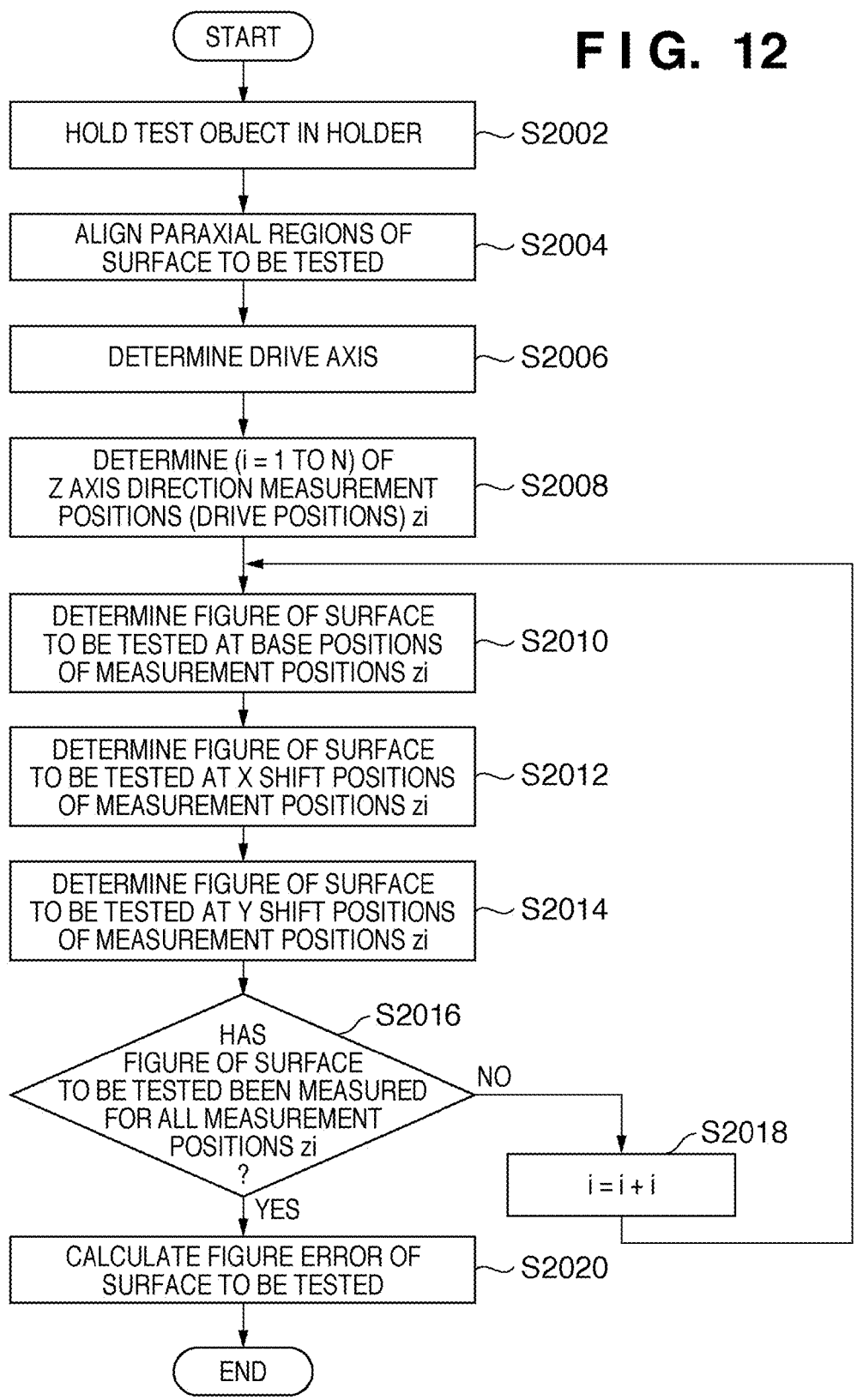
FIG. 12 is a flowchart for describing a measurement process of the measurement apparatus shown in FIG. 1.

Hereinafter, with reference to FIG. 12, description is given regarding measurement processing of the measurement apparatus 1 in a case where the test object TO (surface TOa to be tested) is shifted in the x axis direction and the y axis direction (directions perpendicular to the aspheric surface axis of the aspheric surface) to measure (calculate) measured positions hm on the surface TOa to be tested. This measurement processing is processing in which a figure of the surface TOa to be tested of the test object TO (a figure of the entire surface of the measurement region) is measured, and is executed by the controller 120 comprehensively controlling each unit of the measurement apparatus 1.

At step S2002, the test object TO is caused to be held in the holder 110.

At step S2004, the 5-axis stage 112 and the z-axis stage 114 are used to align the surface TOa to be tested with respect to the TS lens 108 such that interference patterns of paraxial regions of the surface TOa to be tested of the test object TO become null. It should be noted that step S2004 is equivalent to step S1004 shown in FIG. 7, and therefore detailed description is omitted here.

At step S2006, a drive axis of the test object TO (surface TOa to be tested) is determined. The drive axis here is determined so that all the zone regions including paraxial regions become null when the surface TOa to be tested is driven along the drive axis. It should be noted that step S2006 is equivalent to step S1006 shown in FIG. 7, and therefore detailed description is omitted here.

At step S2008, based on the design values of the surface TOa to be tested and the drive axis determined at step S2006, a position to drive the test object TO (surface TOa to be tested) in the z axis direction, namely, a measured position zi is determined. Here, i is an integer of 1 to N, and N is a number of mutually different measured positions. Furthermore, it is preferable that N is determined so that the entire surface of the surface TOa to be tested can be measured with a sufficient sampling precision, for example, approximately 100 to 1,000.

Measurement (calculation) of the figure of the surface TOa to be tested and the abscissa is carried out at each measurement position zi. The measurement positions zi may be determined so that the zone regions at which the interference patterns become null have regular spacings in the coordinates of the surface TOa to be tested, or may be determined so that drive amounts in the z axis direction become uniform.

At step S2010, the z-axis stage 114 is used to arrange the test object TO (surface TOa to be tested) at the base position of the measurement position zi, and a figure of the surface TOa to be tested is measured with respect to the reference surface 108a. Here, the base position refers to a position at which the interference patterns become null in a zonal shape. Furthermore, the figure of the reference surface 108a is assumed to be calibrated in advance.

As described above, a phase shift method is used to execute measurements of the figure of the surface TOa to be tested. At each of the measurement positions zi, the regions at which the interference patterns become null on the capture surface change as shown in FIGS. 4A to 4E in accordance with change in the positions at which the light beams that form spherical waves passing through the TS lens 108 (reference surface 108a) are perpendicularly incident. It should be noted that measured results of the measured positions zi in step S2010 are set as Dbi.

At step S2012, the 5-axis stage 112 is used to arrange the test object TO (surface TOa to be tested) at the X shift position by shifting it from the base position of the measurement position zi in the x axis direction by the known minute amount δx, and a figure of the surface TOa to be tested is measured with respect to the reference surface 108a. It should be noted that measured results at step S2012 are set as Dxi.

At step S2014, the 5-axis stage 112 is used to arrange the test object TO (surface TOa to be tested) at the Y shift position by shifting it from the base position of the measurement position zi in the y axis direction by the known minute amount δy, and a figure of the surface TOa to be tested is measured with respect to the reference surface 108a. It should be noted that measured results at step S2014 are set as Dyi.

At step S2016, a determination is performed as to whether or not measurements have been performed of the figure of the surface TOa to be tested for all the measurement positions zi (that is, whether or not the measurements of step S2010 through S2014 have been executed).

If measurements have not been performed of the figure of the surface TOa to be tested for all the measurement positions zi, then i=i+1 is performed (step S2018) to measure the figure of the surface TOa to be tested at a next measurement position zi, and the procedure returns to step S2010. On the other hand, if the figure of the surface TOa to be tested has been measured for all the measurement positions zi, then the procedure proceeds to step S2020.

In this manner, at step S2010, the surface TOa to be tested is driven in the direction of the aspheric surface axis and positioned in order at (base positions of) multiple measurement positions, and interference patterns are obtained for these base positions respectively (first detection step). Furthermore, at steps S2012 and S2014, the surface TOa to be tested is positioned in the multiple shift positions, which are shifted from the base position in a direction perpendicular to the aspheric surface axis by a known amount, and interference patterns are obtained for these multiple shift positions respectively (second detection step).

At step S2020, the figure error $\Delta n$ (hm) of the surface TOa to be tested from the design value is calculated. Based on the design values of the surface TOa to be tested, and the measured results Dbi, Dxi, and Dyi, the figure error $\Delta n$ is calculated by obtaining a measured value rm of r, a measured position hm on the surface TOa to be tested corresponding to the measured value rm, and a design value rd (hm) of r at the measured position hm.

Specifically, a phase $\phi r$ of the positions (point q and the like shown in FIG. 5A) at which the interference patterns become substantially null is extracted from the measured result Dbi at step S2010, an rm is calculated using expression 9 (first calculation step).

Furthermore, a difference Dnxi is calculated between the measured result Dxi in step S2012 and the measured result Dbi in step S2010, and a difference Dnyi is calculated between the measured result Dyi in step S2014 and the measured result Dbi in step S2010. In other words, change is calculated in the rm of when the surface TOa to be tested was positioned at the base position of the measurement apparatus and of when it was positioned at the shift position (second calculation step). Then, a position hmq=(xmq, ymq) on the surface TOa to be tested corresponding to the point q on the capture surface of the detection unit 118 is calculated from these differences Dnxi and Dnyi using expression 17 and expression 18.

Further still, expression 15 is used to calculate a design value rd(hm) of r at the measured position hm from the position hmq=(xmq, ymq) of the surface TOa to be tested. Then, a difference between rm and rd(hm) is calculated using expression 6, and the calculated result is set as the figure error $\Delta n$ at the position hmq=(xmq, ymq) on the surface TOa to be tested (third calculation step).

The above-described operations are executed for all positions (points) of regions in which interference patterns are substantially null. In this way, the figure error $\Delta n$ and corresponding positions on the surface TOa to be tested are calculated for each measurement position. It should be noted that the figure error $\Delta n$ calculated at each measurement position may be expressed in a 3-dimensional manner, (x, y, $\Delta n$), using the coordinates (x, y) on the surface TOa to be tested. In this way, figure error can be expressed extending over the entire surface of the surface TOa to be tested.

It should be noted that, as described above, if the relationship between the capture surface of the detection unit 118 and the x axis direction of the surface TOa to be tested is calibrated, step S2014 can be omitted and positions on the surface TOa to be tested can be calculated (determined) using only step S2012. Of course, it is also possible to omit step S2012 and calculate (determine) positions on the surface TOa to be tested using only step S2014.

In this way, with the present embodiment, positions on a surface to be tested can be calculated (measured) without using drive amounts of the surface to be tested or an optical path length difference between positions at which the interference patterns become null in a zonal manner and paraxial center positions, and therefore highly precise measurements can be achieved for the figure of an aspheric surface as a surface to be tested.

The present invention is applicable not only to a Fizeau interferometer but also to interferometers that use light beams that form spherical waves (such as a Twyman-Green interferometer or a point diffraction interferometer).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2008-321476 and 2008-321477 filed on Dec. 17, 2008, which are hereby incorporated by reference herein in their entirety.

What is claimed is:

1. A measurement method of illuminating a surface to be tested having an aspheric surface using light beams that form spherical waves, and measuring a figure of the surface to be tested, comprising:
    a first detection step of positioning the surface to be tested at multiple positions by moving the surface to be tested along a direction of an aspheric surface axis of the aspheric surface, with a center of curvature of the spherical waves aligned with the aspheric surface axis, and detecting interference patterns between light beams from the surface to be tested and light beams from a reference surface at each of the multiple positions,
    a second detection step of positioning the surface to be tested at multiple shift positions at which the surface to be tested has been shifted from the multiple positions respectively by a known amount in the direction of the aspheric surface axis, and detecting interference patterns between light beams from the surface to be tested and light beams from the reference surface at each of the multiple shift positions,
    a first calculation step of calculating a length between a center of curvature of the spherical waves and a measurement position on the surface to be tested at which the light beams are perpendicularly incident based on the interference patterns detected in the first detection step and the second detection step for each of the multiple positions and each of the multiple shift positions,
    a second calculation step of calculating, based on a calculation result calculated in the first calculation step, change in the length when positioning of the surface to be tested was performed at the multiple positions relative to when the positioning was performed at the multiple shift positions, and
    a third calculation step of determining the measurement position for each of the multiple positions based on the change in the lengths calculated in the second calculation step, and calculating a figure error, which is a difference between the length obtained from a design value at the determined measurement position of the surface to be tested and the length calculated in the first calculation step for each of the multiple positions.

2. The measurement method according to claim 1, wherein the known amount is not less than 10 times and not greater than 500 times a wavelength of the light beams that illuminate the surface to be tested.

3. The measurement method according to claim 1, wherein the known amount is equivalent to a length in the direction of the aspheric surface axis between the multiple positions respectively.

4. A measurement apparatus that illuminates a surface to be tested having an aspheric surface using light beams that form spherical waves to measure a figure of the surface to be tested, comprising:
    a detection unit configured to detect interference patterns between light beams from the surface to be tested and light beams from a reference surface, and
    a controller configured to control processing for obtaining a figure of the surface to be tested based on the interference patterns detected by the detection unit,
    wherein the controller executes:
    a first detection step of positioning the surface to be tested at multiple positions by moving the surface to be tested along a direction of an aspheric surface axis of the aspheric surface, with a center of curvature of the spherical waves aligned with the aspheric surface axis, and detecting the interference patterns between light beams from the surface to be tested and light beams from the reference surface at each of the multiple positions,
    a second detection step of positioning the surface to be tested at multiple shift positions at which the surface to be tested has been shifted from the multiple positions respectively by a known amount in the direction of the aspheric surface axis, and detecting interference patterns between light beams from the surface to be tested and light beams from the reference surface at each of the multiple shift positions,
    a first calculation step of calculating a length between a center of curvature of the spherical waves and a measurement position on the surface to be tested at which the light beams are perpendicularly incident based on the interference patterns detected in the first detection step and the second detection step in regard to each of the multiple positions and each of the multiple shift positions,
    a second calculation step of calculating, based on a calculation result calculated in the first calculation step, change in the length when positioning of the surface to be tested was performed at the multiple positions relative to when the positioning was performed at the multiple shift positions, and
    a third calculation step of determining the measurement position for each of the multiple positions based on the change in the lengths calculated in the second calculation step, and calculating a figure error, which is a difference between the length obtained from a design value at the determined measurement position of the surface to be tested and the length calculated in the first calculation step for each of the multiple positions.

5. A measurement method of illuminating a surface to be tested having an aspheric surface using light beams that form spherical waves, and measuring a figure of the surface to be tested, comprising:
    a first detection step of positioning the surface to be tested at multiple positions by moving the surface to be tested along a direction of an aspheric surface axis of the aspheric surface, with a center of curvature of the spherical waves aligned with the aspheric surface axis, and detecting interference patterns between light beams from the surface to be tested and light beams from a reference surface at each of the multiple positions,
    a second detection step of positioning the surface to be tested at multiple shift positions at which the surface to be tested has been shifted from the multiple positions respectively by a known amount in a direction perpendicular to the aspheric surface axis, and detecting interference patterns between light beams from the surface to be tested and light beams from the reference surface at each of the multiple shift positions, a first calculation step of calculating a length between a center of curvature of the spherical waves and a measurement position on the surface to be tested at which the light beams are perpendicularly incident based on the interference patterns detected in the first detection step and the second detection step in regard to each of the multiple positions and each of the multiple shift positions, a second calculation step of calculating, based on a calculation result calculated in the first calculation step, change in the length when positioning of the surface to be tested was performed at the multiple positions relative to when the positioning was performed at the multiple shift positions, and a third calculation step of determining the measurement position for each of the multiple positions based on the change in the lengths calculated in the second calculation step, and calculating a figure error, which is a difference between the length obtained from a design value at the determined measurement position of the surface to be tested and the length calculated in the first calculation step for each of the multiple positions.

6. The measurement method according to claim 5, wherein the known amount is not less than 10 times and not greater than 500 times a wavelength of the light beams that illuminate the surface to be tested.

7. The measurement method according to claim 5, wherein, in the second detection step, the surface to be tested is positioned at multiple shift positions at which the surface to be tested has been shifted from the multiple positions in a first direction perpendicular to the aspheric surface axis and in a second direction perpendicular to the aspheric surface axis and the first direction.

8. A measurement apparatus that illuminates a surface to be tested having an aspheric surface using light beams that form spherical waves to measure a figure of the surface to be tested, comprising:

a detection unit configured to detect interference patterns between light beams from the surface to be tested and light beams from a reference surface, and a controller configured to control processing for obtaining a figure of the surface to be tested based on the interference patterns detected by the detection unit, wherein the controller executes:

a first detection step of positioning the surface to be tested at multiple positions by moving the surface to be tested along a direction of an aspheric surface axis of the aspheric surface, with a center of curvature of the spherical waves aligned with the aspheric surface axis, and detecting the interference patterns between light beams from the surface to be tested and light beams from the reference surface at each of the multiple positions, a second detection step of positioning the surface to be tested at multiple shift positions at which the surface to be tested has been shifted from the multiple positions respectively by a known amount in a direction perpendicular to the aspheric surface axis, and detecting interference patterns between light beams from the surface to be tested and light beams from the reference surface at each of the multiple shift positions, a first calculation step of calculating a length between a center of curvature of the spherical waves and a measurement position on the surface to be tested at which the light beams are perpendicularly incident based on the interference patterns detected in the first detection step and the second detection step in regard to each of the multiple positions and each of the multiple shift positions, a second calculation step of calculating, based on a calculation result calculated in the first calculation step, change in the length when positioning of the surface to be tested was performed at the multiple positions relative to when the positioning was performed at the multiple shift positions, and a third calculation step of determining the measurement position for each of the multiple positions based on the change in the lengths calculated in the second calculation step, and calculating a figure error, which is a difference between the length obtained from a design value at the determined measurement position of the surface to be tested and the length calculated in the first calculation step for each of the multiple positions.

* * * * *